(12) United States Patent
Wood

(10) Patent No.: US 6,461,128 B2
(45) Date of Patent: *Oct. 8, 2002

(54) PROGRESSIVE CAVITY HELICAL DEVICE

(76) Inventor: Steven M. Wood, 4904 E. 113$^{th}$, Tulsa, OK (US) 74137

(*) Notice: Subject to any disclaimer, the term of this patent is extended or adjusted under 35 U.S.C. 154(b) by 0 days.

This patent is subject to a terminal disclaimer.

(21) Appl. No.: 09/765,170

(22) Filed: Jan. 18, 2001

(65) Prior Publication Data

US 2001/0005486 A1 Jun. 28, 2001

Related U.S. Application Data

(63) Continuation-in-part of application No. 08/637,086, filed on Apr. 24, 1996, now Pat. No. 5,759,019, and a continuation-in-part of application No. 08/979,290, filed on Nov. 26, 1997, now Pat. No. 6,183,226.

(51) Int. Cl.$^7$ ................................. F01C 1/107
(52) U.S. Cl. .................... 418/48; 418/153; 418/178
(58) Field of Search ..................... 418/48, 153, 178

(56) References Cited

U.S. PATENT DOCUMENTS

| | | | |
|---|---|---|---|
| 2,028,407 A | * 1/1936 | Moineau | 418/48 |
| 3,840,080 A | 10/1974 | Berryman | 175/107 |
| 3,912,426 A | 10/1975 | Tschirky | 418/48 |
| 4,056,362 A | * 11/1977 | Gablin et al. | 418/48 |
| 4,415,316 A | * 11/1983 | Jurgens | 418/48 |
| 4,636,151 A | 1/1987 | Eppink | 418/48 |
| 5,090,497 A | 2/1992 | Beimgraben et al. | 175/107 |
| 5,139,400 A | 8/1992 | Ide | 418/48 |
| 5,171,138 A | 12/1992 | Forrest | 418/48 |
| 5,221,197 A | * 6/1993 | Kochnev et al. | 418/48 |
| 5,363,929 A | 11/1994 | Williams et al. | 175/107 |
| 5,395,221 A | 3/1995 | Tucker, Jr. et al. | 418/48 |
| 5,611,397 A | 3/1997 | Wood | 166/68 |
| 5,759,019 A | 6/1998 | Wood et al. | 418/48 |
| 6,183,226 B1 | * 2/2001 | Wood et al. | 418/48 |

FOREIGN PATENT DOCUMENTS

| | | | | |
|---|---|---|---|---|
| DE | 1935439 | * | 1/1971 | 418/48 |
| DE | 27 13 468 A 1 | | 9/1978 | |
| WO | WO 97/40273 | | 10/1997 | |

* cited by examiner

Primary Examiner—John J. Vrablik
(74) Attorney, Agent, or Firm—Head, Johnson & Kachigian

(57) ABSTRACT

A progressive cavity helical device which includes a stator with an internal helical cavity. A helical rotor operates within the internal helical cavity of the stator. The rotor has a mandrel of metal, plastic or composite material and an outer covering of elastomeric or resilient material.

4 Claims, 5 Drawing Sheets

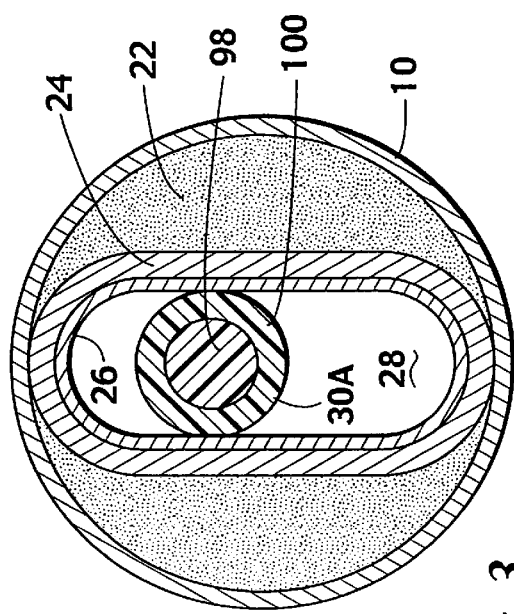
Fig. 2
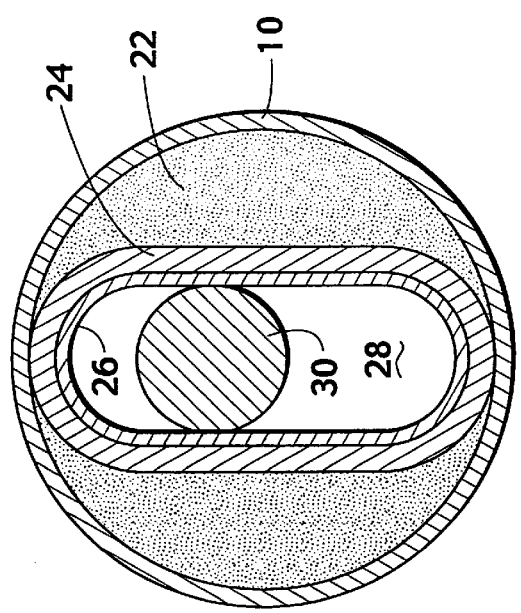
Fig. 3
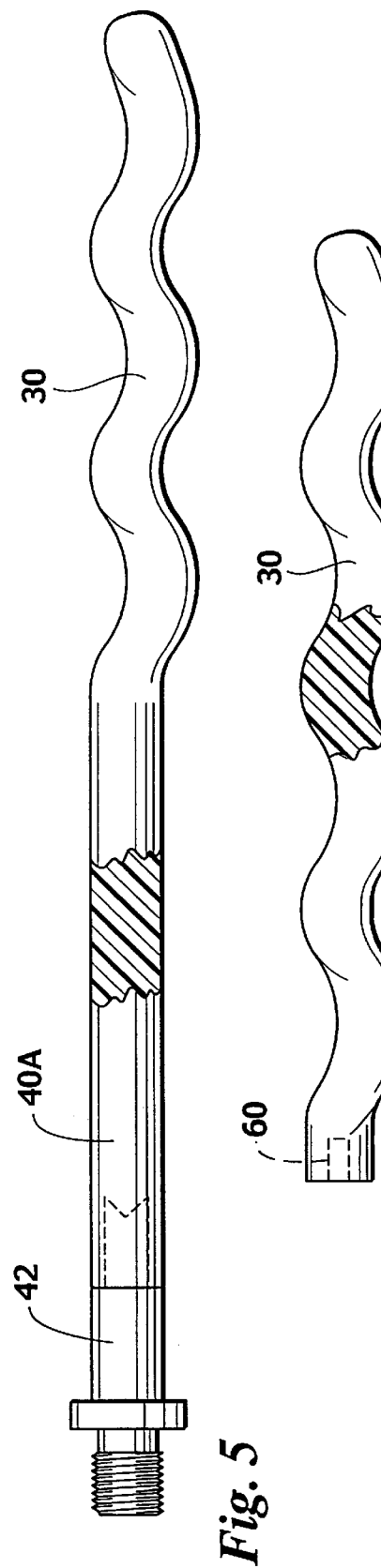
Fig. 5
Fig. 6

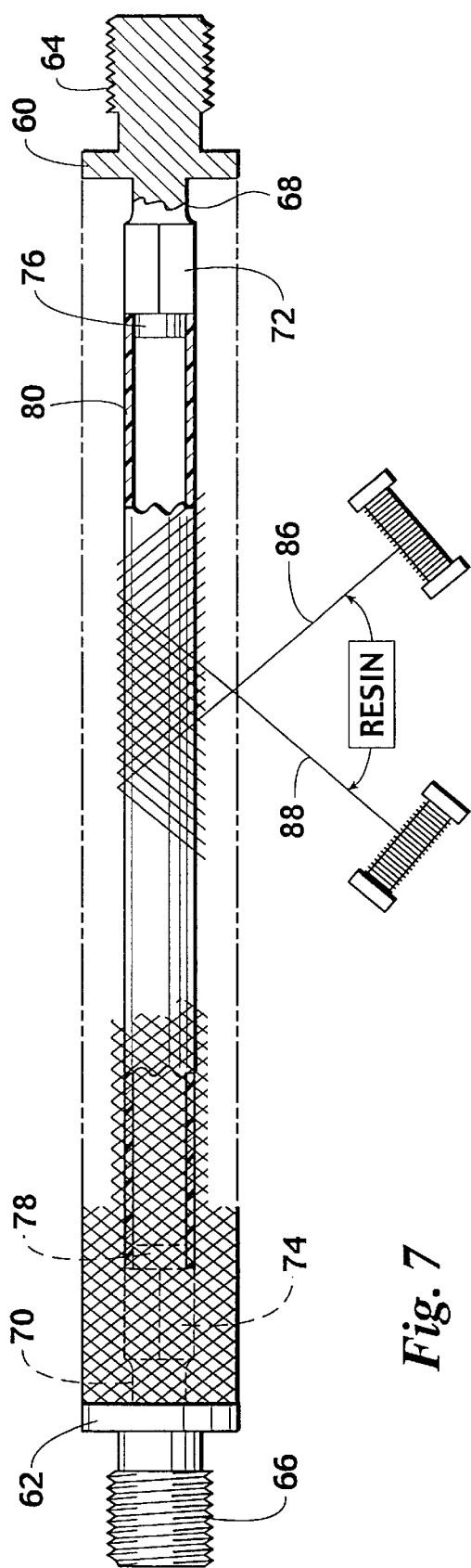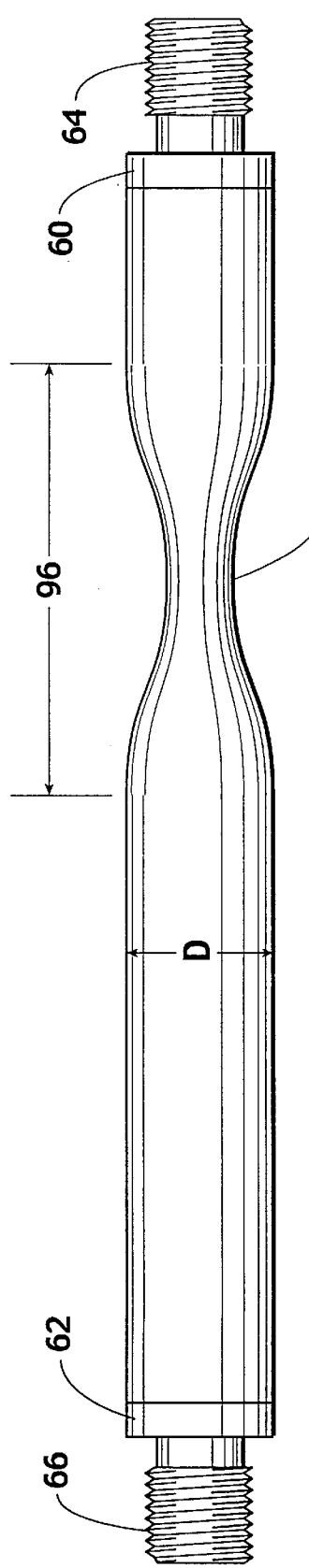
Fig. 7
Fig. 8

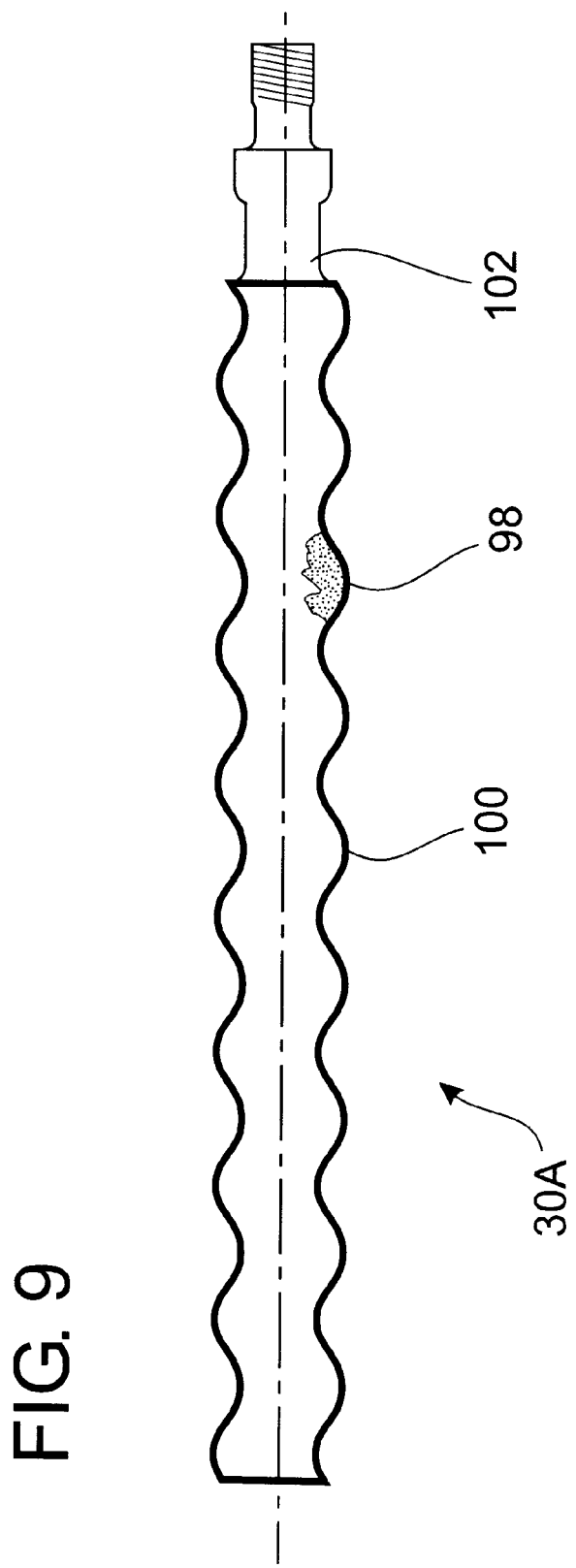

PROGRESSIVE CAVITY HELICAL DEVICE

This application is a continuation-in-part of U.S. patent application Ser. No. 08/637,086, filed Apr. 24, 1996, now U.S. Pat. No. 5,759,019 and a continuation-in-part of U.S. Pat. application Ser. No. 08/979,290, filed Nov. 26, 1997, now U.S. Pat. No. 6,183,226, entitled PROGRESSIVE CAVITY MOTORS USING COMPOSITE MATERIALS.

BACKGROUND OF THE INVENTION

1. Field of the Invention

This invention relates to improvements in progressive cavity style devices of the type composed of a helicoidal rotor acting with a complimentary helicoidal stator and also well known as a "Moineau pump" which may be used as a pump or as a motor to drive other equipment.

2. Prior Art

Progressive cavity helical devices have been known since their invention was disclosed in U.S. Pat. No. 1,892,217, entitled "Gear Mechanism" to Moineau. The helicoidal rotor and the stator engage with each other along a sealing line to create cavities which progress axially as the rotor is rotated relative to the stator. Because of the required sealing and sliding contact concept of a Moineau pump, the stator and the rotor become subject to extensive wear, which necessitates frequent replacement of the stator and/or the rotor. Commercially available Moineau pumps, as well as those disclosed in the prior art, require extensive disassembly of the pumping apparatus to replace the worn stator and/or rotor, in addition to the down time loss of use. In a pump device, rotary motion is applied to the rotor which causes fluids and solids to be passed therethrough. Where the progressive cavity device is used as a motor, one method is to apply fluid pressure to the cavity to cause the rotor to rotate, the power therefrom having many uses. In the case of use in drilling wells, the ability to decrease the frequency of down time and extend the useful life of the motor is a desired objective.

In a progressive cavity pump or motor, problems arise because the axial centerline of the rotor is required to orbit or gyrate relative to the centerline of the stator. Thus, there is a great deal of flexture that must be accounted for to obtain long life of parts. The prior art is filled with various types of universal joints, flexible shafts, and mechanical connections to compensate for the orbital or gyrating type of motion. Many of these are disclosed in U.S. Pat. Nos. 4,923,376 and 2,739,650.

Heretofore, the conventional Moineau pump and motor art has used rubber or elastomer materials bonded to steel for the stator contact surface. Such elastomers include not only natural rubber, but also synthetics, such as G.R.S., neoprene, butyl and nitrile rubbers,. although there are other types such as soft PVC. The key, of course, is to make the elastomer property soft enough to maintain the sealed cavity, yet be hard enough to withstand the abrasive wear from the working contact between the rotor and the stator. The rotor in these instances is usually made of steel. Some efficiency of the pump/motor is lost because the elastomer mold must be thicker at the peaks of the helicoid in order to create the progressive cavity. This lack of uniform thickness creates compressibility differences which, at increasing pressures, causes bypass of the fluids being pumped. Thus, the pump/motor reaches a point where it is less efficient at ever increasing pressure. Because of the different thicknesses, there are different expansion characteristics and different rates and the pump does more work and builds up heat from the friction.

Rubber used as the stator contact surface is not preferable in high temperature environments because of its low heat conductivity. In addition, as progressive cavity devices increase in diameter and/or length, flow characteristics to maintain a successful and long lasting bond of the rubber to a steel housing becomes more difficult. Also, where hydrocarbons make up the material to be pumped, such as in oil producing wells, rubber is known to deteriorate. One attempt to overcome these problems is taught in U.S. Pat. No. 3,912,426 by using multiple stators connected in series with separate but connected rotors for each stator. The stators surfaces, however, are still composed of rubber.

Moineau type rotor and stator devices have been used heretofore for downhole drilling motors for drilling straight or deviated boreholes in earth formations. For instance, see the following U.S. Pat. Nos.

3,840,080
3,912,426
4,415,316
4,636,151
5,090,497
5,171,138

In applicant's prior U.S. Pat. Nos. 5,417,281 and 5,759,019, composites are taught for the progressive cavity pump/motor parts and for the tubing used to carry fluids to the progressive cavity pump.

In the prior art references, there is no teaching of using composites as defined herein in Moineau type motors wherein at least one of the stator and rotor is comprised of a composite material. U.S. Pat. No. 5,759,019 teaches such use in pumps while pending application, Ser. No. 08/979,290, teaches such use in motors.

There remains a need for a progressive cavity helical device having a stator with an internal helical cavity and a helical rotor within the internal helical cavity of the stator wherein the rotor has a mandrel made of metal, plastic or composite material and an outer covering of elastomeric or resilient material.

SUMMARY OF THE INVENTION

It is an overall object of the present invention to disclose new forms of stators, rotors and flex shafts for increasing the efficiency and longevity of progressive cavity helical devices. To that end, a primary object of this invention is to provide the use of elastomers or resilient material in the makeup of the rotor of progressive cavity helical devices.

Another object is to provide a progressive cavity helical device manufactured according to this invention which is capable of use in not only downhole drilling of well bores but for other above ground industrial applications.

Another object of the invention is to provide a progressive cavity helical device in which the output power is available from either end of a rotor. In all cases, the rotary power is derived by forcing fluid to flow into the cavity between the stator and rotor from an inlet to an outlet delivering rotary power at the end or ends of the rotor.

BRIEF DESCRIPTION OF THE DRAWINGS

FIG. 2 is a sectional view taken along the line 2—2 of FIG. 1.

FIG. 3 is a sectional view of another form of progressive cavity motor according to the invention.

FIG. 5 is an elevational view of a composite combination flex shaft and rotor formed as one component.

FIG. 6 is an elevational view of a composite rotor formed separately from the flex shaft.

FIG. 7 is a view describing one method of forming a flex shaft and/or rotor for a progressive cavity motor.

FIG. 8 is an elevational view of an alternate form of flex shaft with a built-in flex point.

FIG. 9 is an elevational and sectional view of one type of rotor having a metal mandrel and a resilient, elastomer covering constructed in accordance with the present invention.

DETAILED DESCRIPTION OF THE PREFERRED EMBODIMENTS

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

Figure 1:
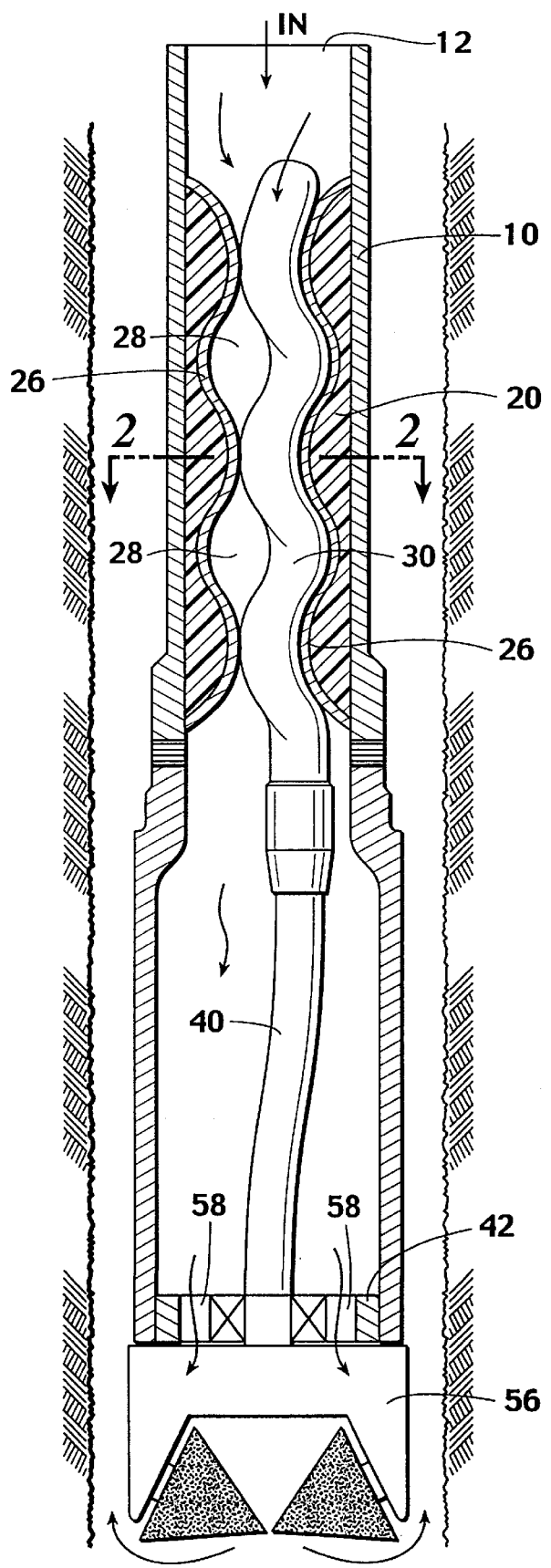
FIG. 1 is a sectional and schematic view of a typical progressive cavity motor according to this invention as used in downhole drilling.

FIG. 1 is a simple representative of a typical progressive cavity or Moineau type motor according to this invention. Such motors include a basic housing 10 through which power fluid enters at 12 into the cavities 28. formed between the rotor and stator to create the rotary motion of the rotor. Specifically, the motor is made up of the helicoid stator 20, and a mated helicoid rotor 30. The rotor includes a flex shaft 40, which in this embodiment is supported by bearings 42 and packing as needed. The pressure fluid exits through or around drill bit 56 via ports 58. The flex shaft 40 and appropriate bearing supports must translate the rotation and gyration of rotor 30 to true rotary motion of shaft 40 which is imported to, in this instance, drill bit 56. The flex shaft 40 must be able to withstand the motor thrust and torque loads, yet be flexible to the gyrational and eccentric motion of rotor 30. Drill pipe bearing support systems as found in U.S. Pat. Nos. 4,636,151 and 3,840,080 are inclusive for use with this aspect of the invention. The invention herein is directed for use in all forms of progressive cavity motor applications, the specific invention being in the makeup of the stator and/or the rotor and/or flex shaft utilizing composite materials.

Composite materials are typically defined to include carbon fibers, boron fibers, ceramic fibers, glass fibers, thermoplastic fibers, natural fibers, metallic fibers, fibrous reinforced and synthetic fibers, all of which are typically impregnated with thermal setting resins. Typical of such thermal setting resins are the alkyd polyesters, general purpose epoxy, general purpose phenolic and urea-formaldehyde compositions.

THE STATOR

The stator formulations of this invention are best described herein with reference to the cross-section shown in FIGS. 2 and 3 which are used herein to describe the various alternate embodiments by reference to those portions of the stator identified as 22, 24 and 26, the latter being the surface by which the rotor 30 will sealably function within the cavities 28. The various stator embodiments are capable of being formed by a variety of methods, including molding and/or machining and thus, provide formulations that can be adapted to a variety of motor uses and environments. Although the drawings indicate the use of an outer housing 10, it is to be understood that in some usages the invention herein could be made up utilizing the stator area without the outer housing 10.

EMBODIMENT A

In this embodiment, stator 20 is comprised of areas 22 and 24 of a composite material which acts as a supportive structure for the helicoid interface 26 of a rubber elastomer. The rotor 30, is comprised of steel or composite materials as hereinafter described. Areas 22 and 24 may be on one unitary member or plural layers of composites in differing characteristics and compositions.

EMBODIMENT B

In this embodiment, areas 22 and 24 are made of a composite material, while the helicoid liner 26 is a thermoplastic resin.

EMBODIMENT C

In this embodiment, composite material will make up the total stator, including areas 22, 24 and 26.

EMBODIMENT D

In this embodiment, areas 22 and 24 are of hardened materials, either machinable or moldable, such as steel or ceramics, with the bonded inner lining 26 being formulated of a composite material.

EMBODIMENT E

The supportive structure 22 and 24 is comprised of a composite material wherein the resin is formulated to create some elastomeric properties with the inner rotor contact surface 26 being of composite material having little or no elastomeric properties. Such a stator of this embodiment will provide an improved sealing and wear surface between the rotor and stator surfaces, thereby increasing mechanical efficiency as well as reducing heat during the motor action. This construction allows for expansion and contraction of the stator parts together, since the thermal transfer coefficient of the composite is higher and capable of wicking off the resulting frictional heat caused by the rotor to stator action.

EMBODIMENT F

Areas 22 and 24 would be comprised of a rubber elastomer with the inner rotor contact surface 26 being a bonded composite material. In this embodiment, the elastomer becomes protected from any deteriorating or abrasive produced fluids and solids and destructive friction between the rotor and stator.

Referring now to FIG. 3, a combination stator and rotor is configured in a variety of manners. In one embodiment, the stator inner face 26 would be of a composite having elastomeric properties with the supporting outer zones 22/24 being a non-compressible composite for use with rotors of steel or non-compressible composite. Various combinations are possible when the rotor 30A is of two part construction of an inner core 98 and outer surface 100. For instance, if the inner core 98 is a non-compressible composite and the outer surface 100 elastomeric composite or rubber, the preferred stator comprising areas 22, 24 and 26 would be non-compressible. Vice-versa, if the core 98 is an elastomeric composite and the outer surface 100 is a non-elastomeric composite, the stator 30 elements 22,24, and 26 would then be a non-elastomeric, non-compressible composite, or surface 26 made of an elastomeric composite, while area 24 and 26 are non-compressible composites.

Figure 4:
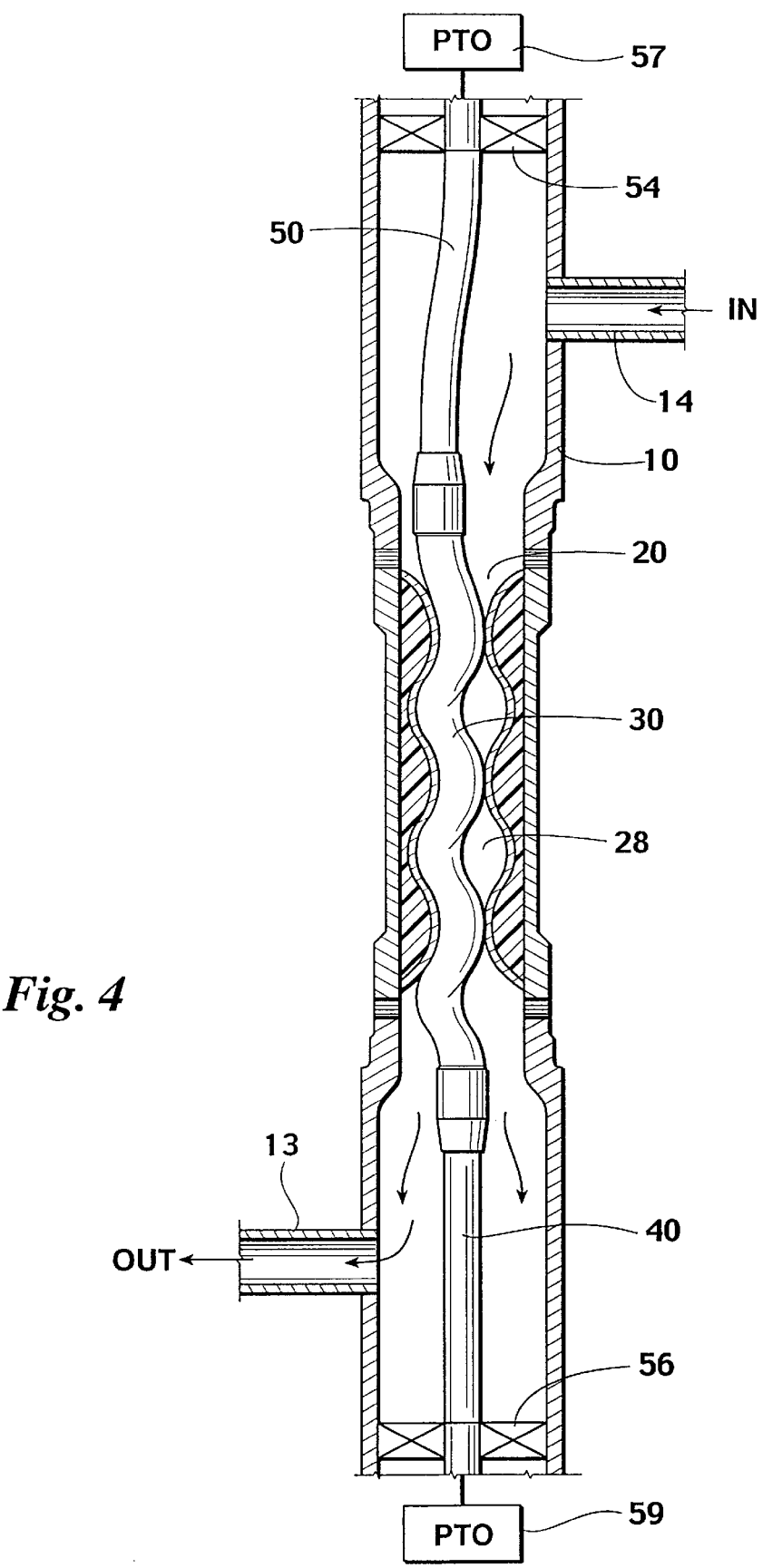
FIG. 4 is a sectional and schematic view of another embodiment of progressive cavity motor according to this invention.

An alternate embodiment is shown in FIG. 4 wherein the power from the rotor may be taken off of at one or both ends as may be applicable to an industrial need. Like number refer to like parts previously described. In this embodiment the housing 10 includes sealed thrust and rotary bearing closures 54 and 56 through which the respective flex shafts, 40 and 50, will transmit pure rotary motion to respective power take-off devices 57 and 59. Pressure fluid enters via conduit 14 and exits via conduit 13.

ROTOR AND FLEX SHAFT

In one embodiment of this invention for use with any of the stator embodiments, the rotor may be steel or formed of a composite material. Another embodiment is to form the rotor 30, and the flex shaft(s) 40 and/or 50 as a single unitary member such as shown in FIG. 5 wherein the flex shaft 40A is combined with a connecting means 42. In another embodiment, a separate rotor as shown in FIG. 6 includes means such as threaded bore 60 which can be attached to a separately made flex shaft. The rotor and the flex shaft can be formed in a variety of ways such as utilizing a resin transfer mold (RTM) for making complex configurations. One method of forming a flex shaft and/or rotor is shown in FIG. 7. Metal or composite end fittings 60 and 62 include an outer molded or machine threaded portion 64 and 66 respectively for connection to the rotor at one or both ends. The fittings include first inner shoulders 68 and 70 for retaining the composite fibers axially to provide tensile and shear strength. Adjacent the inner shoulders are polygonal, usually hexagonal, surfaces 72 and 74 respectively. Inner cylindrical portions 76 and 78 provide a surface to retain a mandrel 80. Mandrel 80 may be any form of material, plastic or metal and is used to assemble the parts and provide support for the process of forming the composite structure of the flex shaft. The mandrel 80 is to have flexibility in and of itself. After assembly of parts 60, 62 and 80, the process of winding resin impregnated composite fibers occurs by rotating the assembly relative to the resin impregnated composite fibers 86 in one angular direction and fibers 88 in the opposite direction, typically 45° as shown, or by rotating the fibers around a fixed mandrel, until the height thereof matches the outer diameter of flanges 60 and 62. Each layer adds anywhere from between 0.025 to 0.040 inches (0.64 to 1.0 mm) per layer. The resin used makes up about 40% of the resulting composition, and because of the wrapping of the layers of composite 86 and 88 in the manner shown, the fibers are oriented at an angle to the sheer plane of the flex shaft. Thus, such a construction, as described, permits the orbital, gyrational, or eccentric movement of the flex shaft relative to an axial power source required to operate a progressive cavity pump.

Another embodiment of flex shaft is shown in FIG. 8 being so constructed to create a flex point 94 formed as a concave indentation less than diameter D. The location of the flex point will vary with the characteristics of the motor including size. The flex point can be formed by changing, via computer controlled means, the angular direction of the composite fibers and/or resin materials at the point or area where flex is desired. For instance, during a filament winding at +45° and −45° up to section 96 (FIG. 7), the angular direction would be changed to angles less than 45° to create a flex section without decreasing overall diameter D.

Ordinarily, the flex shaft and rotor used in progressive cavity motors are made of steel. Utilizing a composite flex shaft permits the use of materials which are anti-isotropic. To make a steel flex shaft more flexible consists of either reducing the wall thickness or making the diameter smaller. Both of these methods reduce the strength of a metallic flex shaft, especially to fatigue. Utilization of a type of composite fiber and the alignment of these fibers permits a larger wall thickness while providing maximum strength and maximum flexibility required in the eccentric orbital motion. Composite materials are inherently better in fatigue application than metals, nor will they rust, corrode or react with the chemicals found in oil production environment; yet, the materials can be used in environments exceeding 600° F. (315° C.). Overall, the strength, fatigue and stiffness of composite materials are found to be equal to and in most cases exceeding the specifications of metals, including titanium, steel, aluminum, etc.

The terms "elastomeric" or "resilient" as used with reference to composites is accomplished by variations in the composite fibers and/or the resin formulations to achieve the desired characteristic. For example, HELOXY flexablizer by Shell Chemical Co. is added to the DPL-862 epoxy resin in an amount within the range of 20–40% by weight. This is then mixed with a hardener and TEFLON® powder in an amount to maintain a workable (flowable) mixture which is then applied to the fiber in the formation of a stator and/or rotor. The resulting composite is oven cured at 300–400° F. (150–200° C.) for approximately four hours.

A further embodiment of the present invention of a rotor 30A constructed in accordance with the teachings of the invention is shown in FIG. 9. The rotor will operate in a stator housing an internal helical cavity. The rotor 30A has a helical mandrel 98 composed of metal. It will be understood that the mandrel 98 may alternately be composed of plastic or composite material. Surrounding the mandrel 98 is a layer or outer covering of elastomeric or resilient material 100. The layer of outer covering of elastomeric material may be nitryl rubber, butyl rubber, polyurethane or other elastomeric material that will withstand elevated temperatures and corrosive environments. In one embodiment, a 0.125 inch thick layer of elastomeric or resilient material is bonded to the rotor surface. Such bonding can be through thermal, chemical compression or other well known adhesive methods.

Whereas, the present invention has been described in relation to the drawings attached hereto, it should be understood that other and further modifications, apart from those shown or suggested herein, may be made within the spirit and scope of this invention.

What is claimed is:

1. A progressive cavity helical device which comprises:
    a stator with an internal helical cavity; and
    a helical rotor within said internal helical cavity of said stator, said rotor having a mandrel of non-resilient composite material formed of a plurality of filament fibers impregnated with a thermal setting resin; and
    an outer covering of elastomeric or resilient material bonded to said mandrel.

2. A progressive cavity helical device as set forth in claim 1 wherein said elastomeric or resilient material is nitryl rubber.

3. A progressive cavity helical device as set forth in claim 1 wherein said elastomeric or resilient material is butyl rubber.

4. A progressive cavity helical device as set forth in claim 1 wherein said elastomeric or resilient material is polyurethane.

* * * * *